(12) United States Patent
Matsumoto

(10) Patent No.: US 10,576,871 B2
(45) Date of Patent: Mar. 3, 2020

(54) VEHICLE LAMP

(71) Applicant: Koito Manufacturing Co., Ltd., Tokyo (JP)

(72) Inventor: Akinori Matsumoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/008,379

(22) Filed: Jun. 14, 2018

(65) Prior Publication Data

US 2019/0126808 A1    May 2, 2019

(30) Foreign Application Priority Data

Jun. 16, 2017    (JP) .................................. 2017-118648

(51) Int. Cl.
| | | |
|---|---|---|
| *B60Q 1/04* | (2006.01) | |
| *F21S 41/29* | (2018.01) | |
| *F21V 13/04* | (2006.01) | |
| *F21V 7/09* | (2006.01) | |
| *F21S 41/33* | (2018.01) | |
| *F21S 41/176* | (2018.01) | |
| *F21S 41/16* | (2018.01) | |

(Continued)

(52) U.S. Cl.
CPC .............. *B60Q 1/04* (2013.01); *F21S 41/16* (2018.01); *F21S 41/176* (2018.01); *F21S 41/255* (2018.01); *F21S 41/295* (2018.01); *F21S 41/33* (2018.01); *F21S 41/333* (2018.01); *F21S 45/70* (2018.01); *F21V 7/09* (2013.01); *F21V 13/04* (2013.01); *F21W 2102/13* (2018.01)

(58) Field of Classification Search
CPC ... B60Q 1/04; F21V 7/09; F21V 13/04; F21S 41/295; F21S 41/33
See application file for complete search history.

(56) References Cited

U.S. PATENT DOCUMENTS 8,708,537 B2 *    4/2014    Takahashi ............... F21V 13/00
                                                                  362/509
8,888,342 B2 *   11/2014    Takahashi ............... F21V 13/00
                                                                  362/509

(Continued)

FOREIGN PATENT DOCUMENTS

JP        06-291062 A      10/1994
JP        10-144668 A       5/1998

(Continued)

*Primary Examiner* — Britt D Hanley
(74) *Attorney, Agent, or Firm* — Abelman, Frayne & Schwab

(57) ABSTRACT

A reflector is configured such that an opening is formed in a portion located on an extension line of the optical path of laser light from a laser light emitting element to a light emitter. In addition, a reflective surface of the reflector includes a first reflective area located at the front side of the opening and a second reflective area located at the rear side of the opening, and the first reflective area is displaced to the light emitter side with respect to the second reflective area. Thereby, compared with a case where a first reflective area is formed in a curved shape obtained by extending the second reflective area as in the related art, a large solid angle based on the light emission center of the light emitter is secured, and a luminous flux utilization ratio with respect to the light emitted from the light emitter is increased.

9 Claims, 8 Drawing Sheets

(51) Int. Cl.
*F21S 41/255* (2018.01)
*F21S 45/70* (2018.01)
*F21W 102/13* (2018.01)

(56) References Cited

U.S. PATENT DOCUMENTS

| | | | | |
|---|---|---|---|---|
| 9,109,771 B2* | 8/2015 | Takahashi | ............... | F21S 41/16 |
| 9,169,985 B2* | 10/2015 | Takahashi | ............... | F21V 13/00 |
| 9,869,454 B2* | 1/2018 | Kim | ............... | F21V 13/04 |
| 2012/0327679 A1* | 12/2012 | Takahashi | ............... | F21S 41/14 |
| | | | | 362/538 |
| 2013/0027951 A1* | 1/2013 | Takahashi | ............... | B60Q 1/085 |
| | | | | 362/465 |
| 2015/0062943 A1* | 3/2015 | Takahira | ............... | F21S 41/675 |
| | | | | 362/510 |
| 2019/0110345 A1* | 4/2019 | Ichikawa | ............... | H02M 3/155 |

FOREIGN PATENT DOCUMENTS

| | | |
|---|---|---|
| JP | 2001-335938 A | 12/2001 |
| JP | 2005-064017 A | 3/2005 |
| JP | 2009-094311 A | 4/2009 |
| JP | 2015-146396 A | 8/2015 |

* cited by examiner

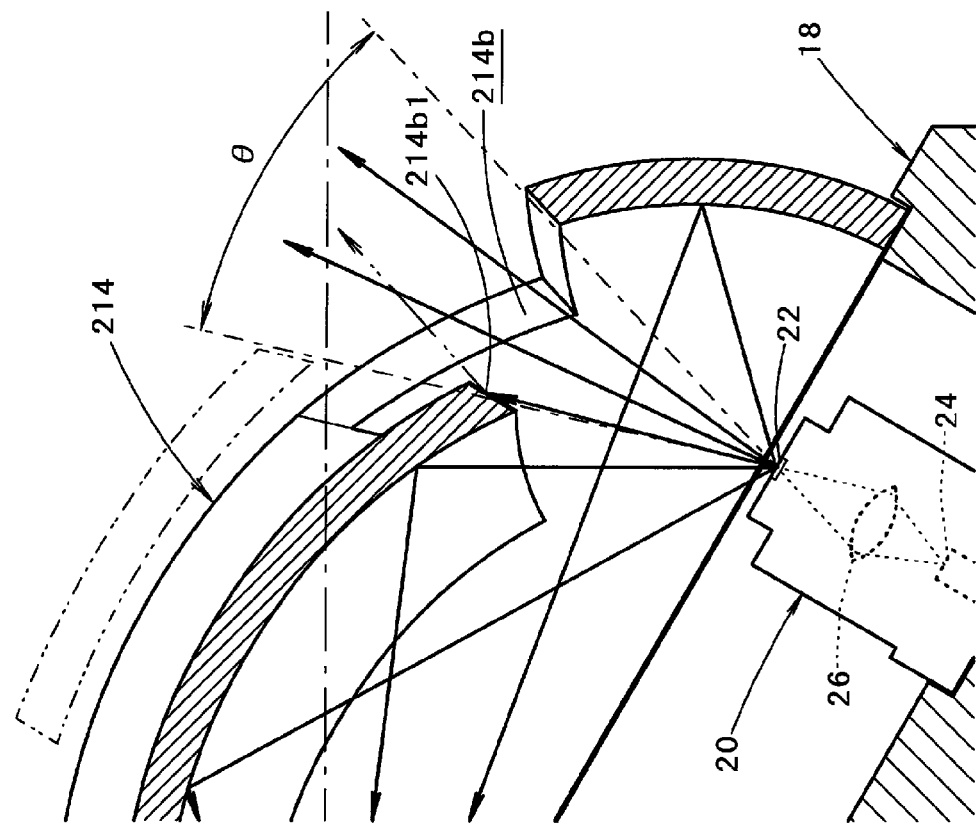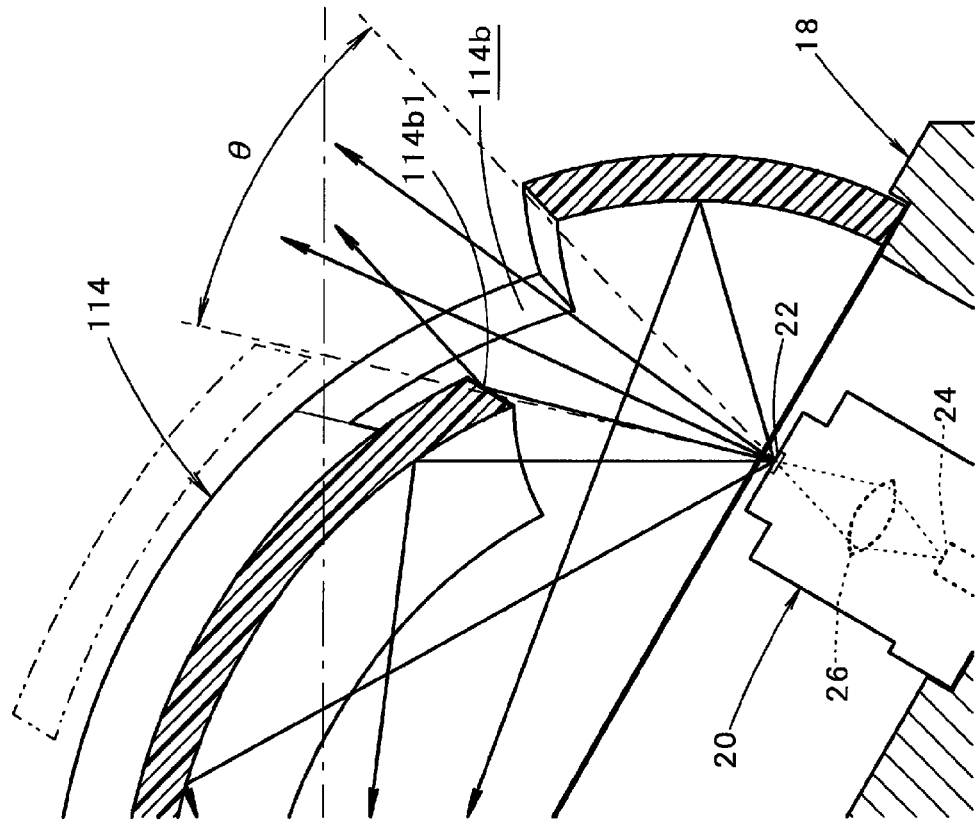

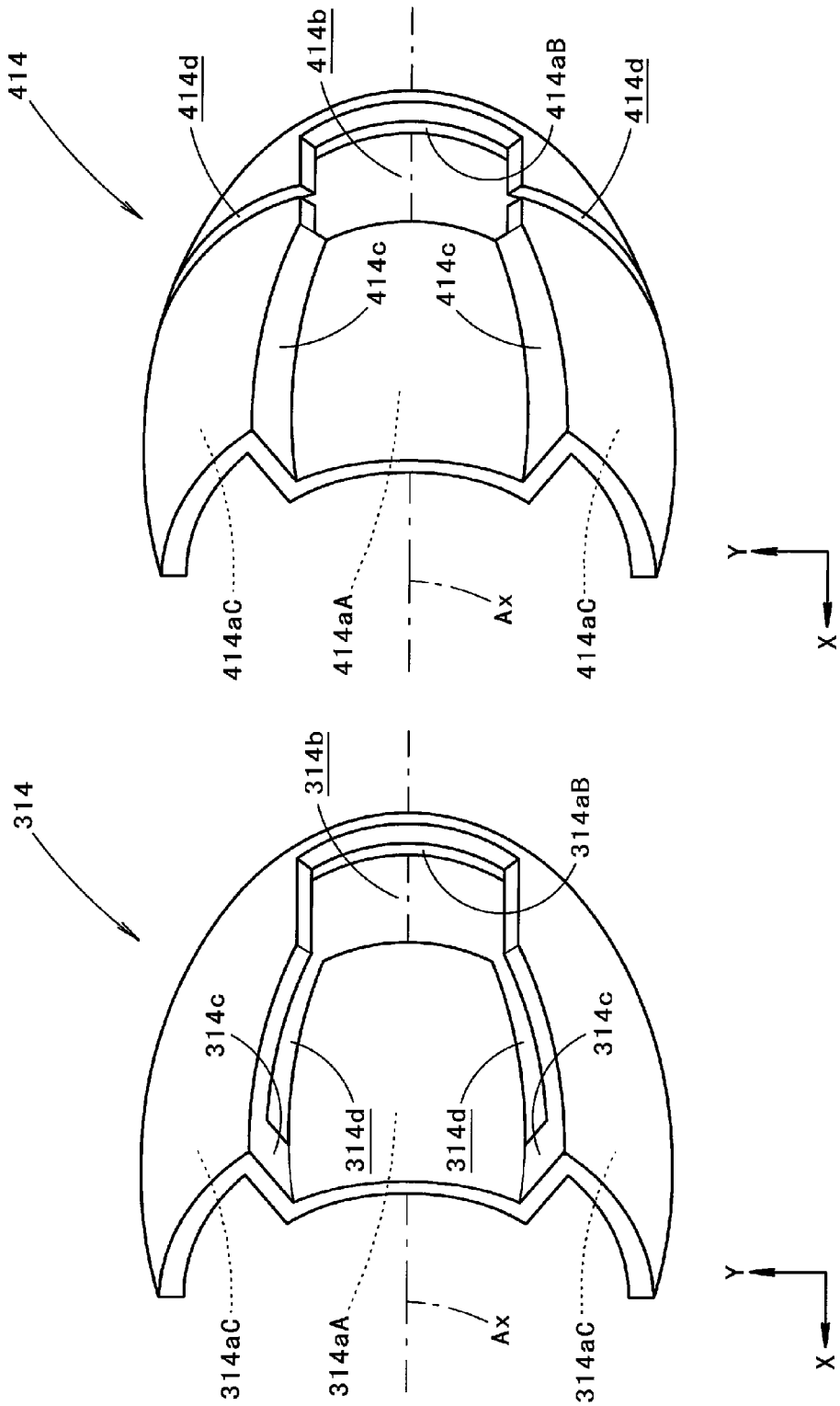

VEHICLE LAMP

CROSS-REFERENCE TO RELATED APPLICATIONS

This application is based on and claims priority from Japanese Patent Application No. 2017-118648 filed on Jun. 16, 2017 with the Japan Patent Office, the disclosure of which is incorporated herein in its entirety by reference.

TECHNICAL FIELD

The present disclosure relates to a projector type vehicle lamp having a reflector.

BACKGROUND

In the related art, a projector type vehicle lamp has been known, which is configured to cause light emitted from a light source and reflected by a reflector, to be incident on a projection lens. It has been also known that a light emitter, which emits light by laser light irradiation from a laser light emitting element, as the light source for the projector type vehicle lamp.

Japanese Patent Laid-Open Publication No. 2015-146396 discloses a reflector of such a vehicle lamp in which an opening is formed through the reflector in a portion located on the extension line of the optical path of laser light directed from a laser light emitting element toward a light emitter.

SUMMARY

With a configuration in which the opening is formed in the portion of the reflector located on the extension line of the optical path of the laser light, like the vehicle lamp disclosed in Japanese Patent Laid-Open Publication No. 2015-146396, even when the light emitter has fallen off, it is possible to prevent the laser light, which is bright and has strong directivity, from being reflected by the reflector and irradiating the front of a vehicle.

However, in the case of adopting such a configuration, a new problem arises as follows.

That is, the projector type vehicle lamp, which is configured to reflect the light emitted from the light emitter, which emits light by laser light irradiation, by the reflector, is suitable for forming a bright spot-shaped light distribution pattern (e.g., light distribution pattern for enhancing the center luminous intensity of a high beam light distribution pattern). However, when the opening as described in Japanese Patent Laid-Open Publication No. 2015-146396 is formed in the reflector, it is not possible to obtain light reflected from the area in which the opening is formed, and therefore, the brightness of the light distribution pattern decreases by that much.

Such a problem may also occur in the case where the reflector is disposed between the laser light emitting element and the light emitter and the opening is formed in the portion of the reflector located on the optical path of the laser light directed from the laser light emitting element toward the light emitter.

The present disclosure has been made in view of these circumstances, and the present disclosure provides a projector type vehicle lamp, which is configured to reflect light from a light emitter, which emits light by laser light irradiation, by a reflector, and which is capable of forming a bright light distribution pattern even when an opening is formed in the reflector.

The present disclosure achieves the above object by devising a configuration of the reflector.

That is, a vehicle lamp according to a present aspect of the present disclosure includes a projection lens, a light emitter disposed behind the projection lens, and a reflector configured to reflect light emitted from the light emitter toward the projection lens. The light emitter is configured to emit light by laser light irradiation from a laser light emitting element, the reflector has an opening formed through the reflector in a portion located on an optical path of laser light directed from the laser light emitting element toward the light emitter or on an extension line of the optical path, and a reflective surface of the reflector includes a first reflective area located at a front side of the opening and a second reflective area located at a rear side of the opening, the first reflective area being displaced to a light emitter side with respect to the second reflective area.

In addition, a vehicle lamp according to a second aspect of the present second disclosure includes a projection lens, a light emitter disposed behind the projection lens, and a reflector configured to reflect light emitted from the light emitter toward the projection lens. The light emitter is configured to emit light by laser light irradiation from a laser light emitting element, the reflector has an opening formed through the reflector in a portion located on an optical path of laser light directed from the laser light emitting element toward the light emitter or on an extension line of the optical path, and a reflective surface of the reflector includes a first reflective area located at a front side of the opening and a second reflective area located at a rear side of the opening. In a case where it is assumed that the second reflective area extends to a front end position of the opening, the first reflective area is configured to reflect the light emitted from the light emitter toward an area in which the light emitted from the light emitter, reflected by the assumed imaginary reflective area, is incident on the projection lens.

The "light emitter" is not particularly limited in a specific configuration thereof as long as it emits light by laser light irradiation from the laser light emitting element.

The "light emitter" may be configured to emit light as the laser light passes through the light emitter, or may be configured to emit light as the laser light is reflected by the light emitter.

As long as the "opening" is formed in the portion of the reflector located on the optical path of the laser light from the laser light emitting element toward the light emitter or on the extension line of the optical path, for example, a specific shape or size of the opening is not particularly limited. In addition, the "opening" may be formed as a closed space, or may be formed as an open space that communicates with an external space through, for example, a slit.

A specific surface shape of the reflective area, excluding the first and second reflective areas, on "the reflective surface of the reflector" is not particularly limited.

The vehicle lamp according to the present first disclosure is configured as a projector type vehicle lamp that reflects the light emitted from the light emitter, which emits light by laser light irradiation, by the reflector, and the reflector has an opening formed through the reflector in a portion located on the optical path of the laser light directed from the laser light emitting element toward the light emitter or on an extension line of the optical path. Since the reflective surface of the reflector is formed in a state where the first reflective area located at the front side of the opening is displaced to the light emitter side, with respect to the second reflective area located at the rear side of the opening, the following acting effects may be obtained.

That is, since the first reflective area is displaced to the light emitter side with respect to the second reflective area, as compared to a conventional case where the first reflective area is formed in a curved surface shape obtained by extending the second reflective area, it is possible to secure a large solid angle on the basis of the light emission center of the light emitter, and thereby, to increase the utilization rate of luminous flux from the light emitter. Thus, it is possible to form a bright light distribution pattern, despite the fact that the opening is formed in the reflector.

According to the present first disclosure as described above, in the projector type vehicle lamp configured to reflect the light emitted from the light emitter, which emits light by laser light irradiation, by the reflector, it is possible to form a bright light distribution pattern even when the opening is formed in the reflector.

In the above configuration, both the first and second reflective areas may be configured with a curved surface having an ellipsoidal surface as a reference surface, and an eccentricity of the ellipsoid surface, which serves as the reference surface of the first reflective area, may be set to a value larger than an eccentricity of the ellipsoidal surface, which serves as the reference surface of the second reflective area. With this configuration, the degree of convergence of light of a first light distribution pattern, formed by the reflected light from the first reflective area, may become closer to the degree of convergence of light of a second light distribution pattern formed by the reflected light from the second reflective area. Then, this makes is possible to form a bright light distribution pattern in which spot-shaped light distribution patterns having a uniform size are superimposed.

In such a case, both the first and second reflective areas may be configured to reflect the light emitted from the light emitter, toward a rear-side focal point of the projection lens in a vertical plane including an optical axis of the projection lens. With this configuration, it is possible to maximize the degree of convergence of light of the first and second light distribution patterns, formed by the reflected light from each of the first and second reflective areas, with respect to the vertical direction. Then, this makes it possible to form the entire light distribution pattern as a light distribution pattern having excellent far visibility in front of the vehicle.

In the above configuration, a reflective area, excluding the first and second reflective areas, on the reflective surface of the reflector may be formed by using the ellipsoidal surface, which serves as the reference surface of the second reflective area, as a reference surface. With this configuration, it is possible to form a light distribution pattern, formed by the reflected light from the reflective area, as a light distribution pattern that is smoothly connected to with the second light distribution pattern.

In the above configuration, a reflective surface treatment (e.g., aluminum vapor deposition) may be performed on an inner peripheral surface of the opening in the reflector. With this configuration, even when the inner peripheral surface of the opening is irradiated with the laser light due to falling off of the light emitter, the laser light may be reflected from the inner peripheral surface. Thus, even when the reflector is configured with, for example, a resin molded article, it is possible to prevent the peripheral portion of the opening from inadvertently melting by laser light irradiation. Then, this makes it possible to increase the degree of freedom of the shape of the inner peripheral surface of the opening (e.g., to form the inner peripheral surface of the opening with an inclination angle at which the reflector is easily formed).

In the above configuration, a light absorption treatment (e.g., black painting) may be performed on an inner peripheral surface of the opening in the reflector. With this configuration, even when the inner peripheral surface of the opening is irradiated with the laser light due to falling off of the light emitter, the inner peripheral surface may absorb the light. Thus, it is possible to prevent the laser beam reflected from the inner peripheral surface from becoming stray light and irradiating the front of the vehicle, which causes the generation of glare light. In addition, with a configuration in which the reflector is configured with, for example, a die-cast molded article, even when the light absorption treatment is performed on the inner peripheral surface of the opening, there is no risk of the peripheral portion of the opening melting by laser light irradiation. Thus, it is possible to increase the degree of freedom of the shape of the inner peripheral surface of the opening.

The vehicle lamp according to the present second disclosure is configured as a projector type vehicle lamp that reflects the light emitted from the light emitter, which emits light by laser light irradiation, by the reflector, and the reflector has an opening formed through the reflector in a portion located on the optical path of the laser light directed from the laser light emitting element toward the light emitter or on an extension line of the optical path. The reflective surface of the reflector includes the first reflective area located at the front side of the opening and the second reflective area located at the rear side of the opening and in a case where it is assumed that the second reflective area extends to the front end position of the opening, the first reflective area is configured to reflect the light emitted from the light emitter toward the area in which the light emitted from the light emitter and reflected by the assumed imaginary reflective area, is incident on the projection lens, the following acting effects may be obtained.

That is, since the reflected light from the first reflective area is incident on the area in which where the reflected light from the imaginary reflective area is incident on the projection lens, the projection lens may be effectively utilized over a wide range, and thereby, light distribution control may be performed with high accuracy.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 6A and 6B are views similar to FIG. 3 illustrating a major part of a vehicle lamp according to first and second modifications of the exemplary embodiment.

FIGS. 7A and 7B are plan views illustrating a reflector of the vehicle lamp according to third and fourth modifications of the exemplary embodiment as a single item.

DESCRIPTION OF EMBODIMENT

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, an exemplary embodiment of the present disclosure will be described with reference to the accompanying drawings.

Figure 1:
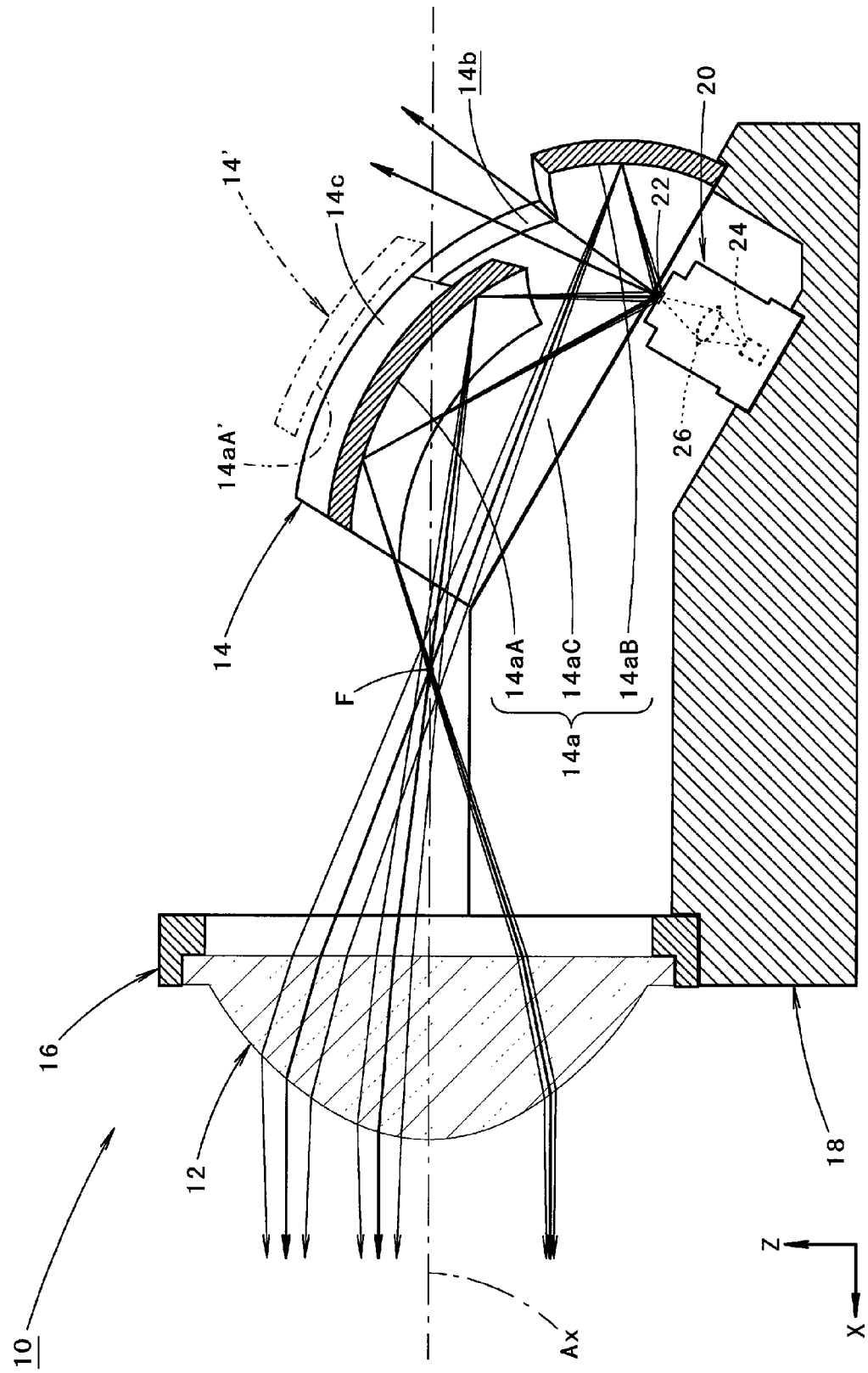
FIG. 1 is 1 is a side cross-sectional view illustrating a vehicle lamp according to one exemplary embodiment of the present disclosure.
Figure 2:
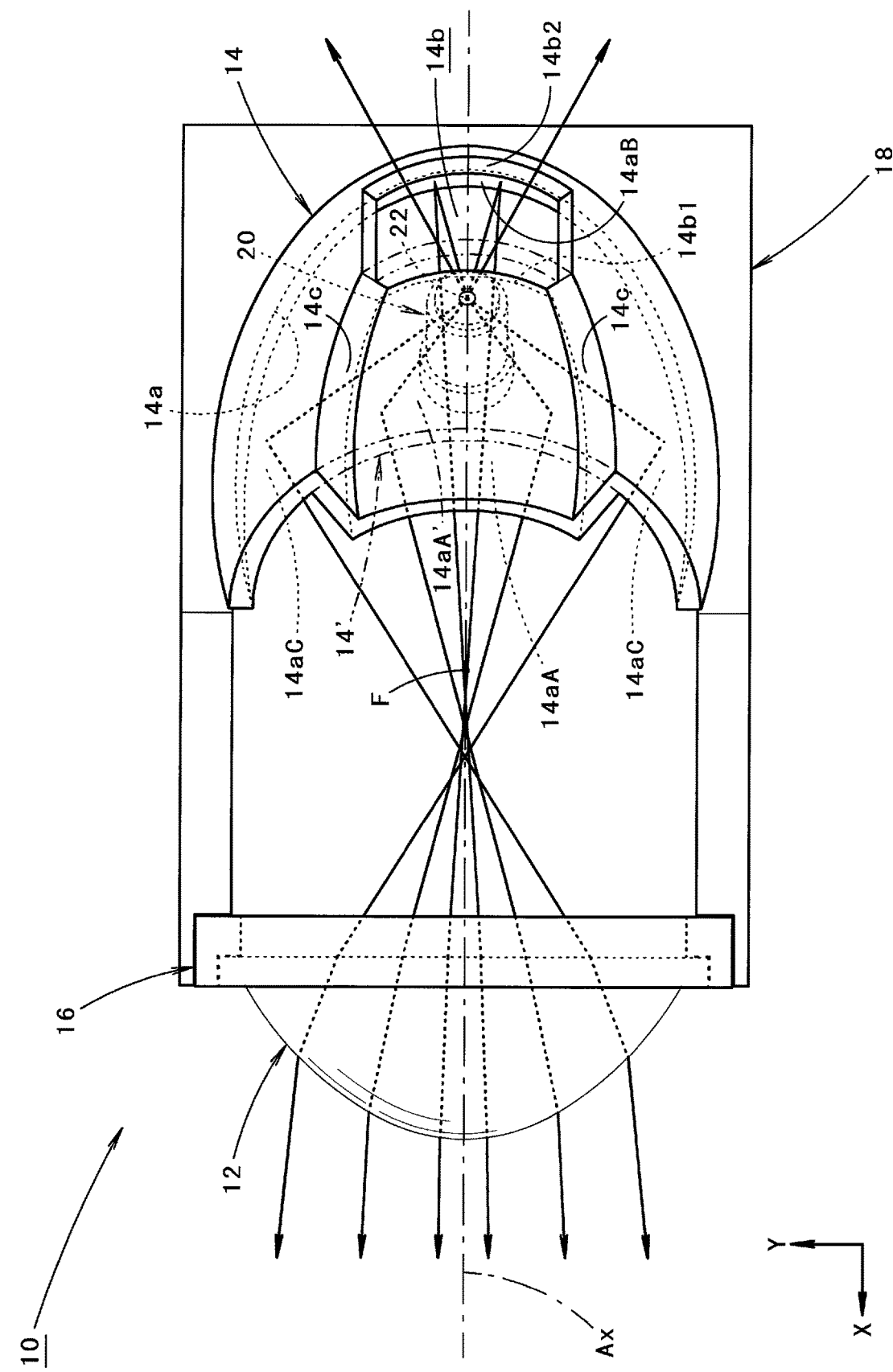
FIG. 2 is a plan view illustrating the vehicle lamp.

FIG. 1 is a side cross-sectional view illustrating a vehicle lamp 10 according to one exemplary embodiment of the present disclosure, and FIG. 2 is a plan view thereof.

In these drawings, the direction indicated by X is the "front direction" as the lamp (also "front" as a vehicle), the direction indicated by Y is the "right direction", and the direction indicated by Z is the "upper direction". This is also applied to the other drawings.

As illustrated in these drawings, the vehicle lamp 10 according to the present exemplary embodiment is configured as a projector type lamp unit that is used in a state of being mounted as a part of a head lamp.

That is, the vehicle lamp 10 includes a projection lens 12, a light emitter 22, which serves as a light source disposed at the rear side of a rear-side focal point F of the projection lens 12, and a reflector 14, which reflects light emitted from the light emitter 22, toward the projection lens 12.

The projection lens 12 is a plano-convex aspherical lens having a convex front surface and a flat rear surface, and is configured to project a light source image, formed on a rear-side focal plane, which serves as a focal plane including the rear-side focal point F, onto an imaginary vertical screen in front of the lamp as a reversed image. The projection lens 12 is supported on a lens holder 16 at an outer peripheral flange portion thereof, and the lens holder 16 is supported on a base member 18.

The light emitter 22 is configured as a part of a light source unit 20.

The light source unit 20 is configured to converge light, emitted from a laser light emitting element 24, on the light emitter 22 by a condensing lens 26, and to emit the light, as diffused light, from the surface side of the light emitter 22.

The laser light emitting element 24 is configured with a laser diode, and is configured to irradiate the light emitter 22 with laser light from the back side thereof.

The light emitter 22 is configured with a phosphor, which emits white light by laser light irradiation from the laser light emitting element 24, and is formed with a circular light emitting surface on the surface side thereof.

The light source unit 20 is supported on the base member 18 in a state where the light emitting surface of the light emitter 22 is oriented in a direction that is inclined by about 10° to 45° (e.g., about 30°) to the rear side relative to the vertical upper direction.

The reflector 14 is configured with, for example, a resin molded article or a die-cast molded article.

The reflector 14 is supported on the base member 18 at the lower end edge thereof in a state where the reflector 14 is disposed so as to cover the light source unit 20 from the upper side thereof. In this case, the reflector 14 is disposed slightly above an inclined plane, which includes the light emitting surface of the light emitter 22, in a state where the lower end edge of the reflector 14 extends parallel to the inclined plane.

The reflector 14 has an opening 14$b$ formed through the reflector 14 in a portion thereof located on an extension line of the optical path of the laser light directed from the laser light emitting element 24 to the light emitter 22.

The opening 14$b$ is formed to have a substantially horizontally elongated rectangular opening shape in a state where the reflector 14 is viewed obliquely from the upper rear side.

Figure 3:
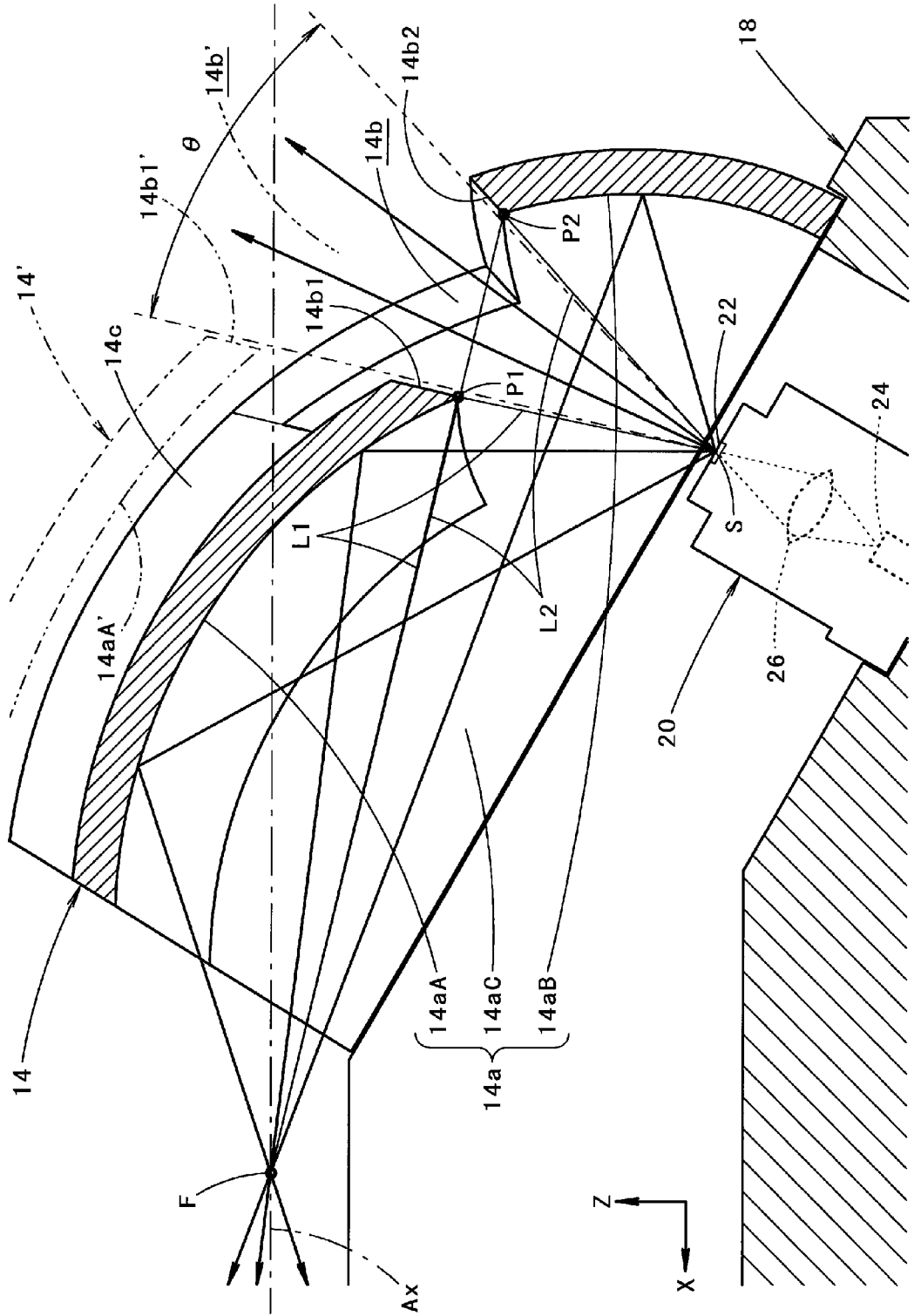
FIG. 3 is a detailed view of a major part of FIG. 1.

FIG. 3 is a detailed view of a major part of FIG. 1.

An angle θ illustrated in FIG. 3 indicates a diffusion angle when convergent light, directed from the condensing lens 26 toward the light emitter 22, diverges from the position of the light emitter 22, in a case where it is assumed that the light emitter 22 has fallen off from the illustrated position.

The opening 14$b$ is formed in a positional relationship in which a front end surface 14$b$1 and a rear end surface 14$b$2 slightly deviate from the range of the angle θ in the vertical plane including the optical axis Ax of the projection lens 12. In this case, both the front end surface 14$b$1 and the rear end surface 14$b$2 are formed so as to extend substantially in parallel with straight lines that extend at the angle θ (straight lines indicated by one-dot chain lines in the drawing).

By configuring the reflector 14 such that the opening 14$b$ is formed therein, even when the light emitter 22 has fallen off, the laser light, which is bright and has strong directivity, is prevented from being reflected by the reflector 14 and irradiating the front of the vehicle, and thereby, fail-safe is achieved.

A reflective surface 14$a$ of the reflector 14 is formed such that a first reflective area 14$a$A located at the front side of the opening 14$b$ is displaced to the light emitter 22 side, with respect to a second reflective area 14$a$B located at the rear side of the opening 14$b$.

Both the first and second reflective areas 14$a$A and 14$a$B have a reflective surface shape formed by using an ellipsoidal surface, which has the light emission center S of the light emitter 22 as a first focal point, as a reference surface.

Specifically, each of the first and second reflective areas 14$a$A and 14$a$B has an ellipsoidal cross-sectional shape along a plane including a straight line that interconnects the light emission center S of the light emitter 22 and the rear-side focal point F of the projection lens 12, the eccentricity thereof is set so as to gradually increase from the vertical cross section toward the horizontal cross section, and the rear-side focal point F of the projection lens 12 is a second focal point in the vertical cross section.

Then, this makes it possible for both the first and second reflective areas 14$a$A and 14$a$B to converge the light emitted from the light emitter 22 to the rear-side focal point F of the projection lens 12 in the vertical cross section.

However, the eccentricity of the ellipsoidal surface, which serves as the reference surface of the first reflective area 14$a$A, is set to a value larger than the eccentricity of the ellipsoidal surface, which serves as the reference surface of the second reflective area 14$a$B. Thereby, the first reflective area 14$a$A is formed so as to be displaced to the light emitter 22 side, with respect to the second reflective area 14$a$B.

That is, in the vertical plane including the optical axis Ax, the length of a bent line L1 that interconnects three points including the light emission center S of the light emitter 22, a point P1 located at the lower end edge of the front end surface 14b1 of the opening 14b (i.e., the rear end edge of the first reflective area 14aA), and the rear-side focal point F is set to a value smaller than the length of a bent line L2 that interconnects three points including the light emission center S of the light emitter 22, a point P2 located at the lower end edge of the rear end surface 14b2 of the opening 14b (i.e., the front end edge of the second reflective area 14aB), and the rear-side focal point F.

In this case, the specific amount of displacement of the first reflective area 14aA to the light emitter 22 side is set to a value at which a portion that interconnects the point P1 of the bent line L1 and the rear-side focal point F substantially coincides with a portion that interconnects the point P2 of the bent line L2 and the rear-side focal point F.

A third reflective area 14aC, excluding the first and second reflective areas 14aA and 14aB, on the reflective surface 14a of the reflector 14 is formed by using, the ellipsoidal surface, which serves as the reference surface of the second reflective area 14aB, as a reference surface, and has a reflective surface shape obtained by extending the reflective surface shape of the second reflective area 14aB.

The reflector 14 is formed, on the left and right sides of the first reflective area 14aA, with a pair of left and right vertical wall portions 14c, which interconnect a portion forming the first reflective area 14aA and a portion forming the third reflective area 14aC. Each vertical wall portion 14c is formed so as to extend in a direction that is inclined at a predetermined angle in a direction away from the optical axis Ax relative to the vertical upper direction. The predetermined angle is set to a value that is as small as possible within a range in which the light emitted from the light emitter 22 is not incident on the inner surface of the vertical wall portion 14c.

FIG. 4 is a side cross-sectional view illustrating the vehicle lamp 10 according to the present exemplary embodiment in contrast to a conventional vehicle lamp 10'.

Figures 4A, 4B:
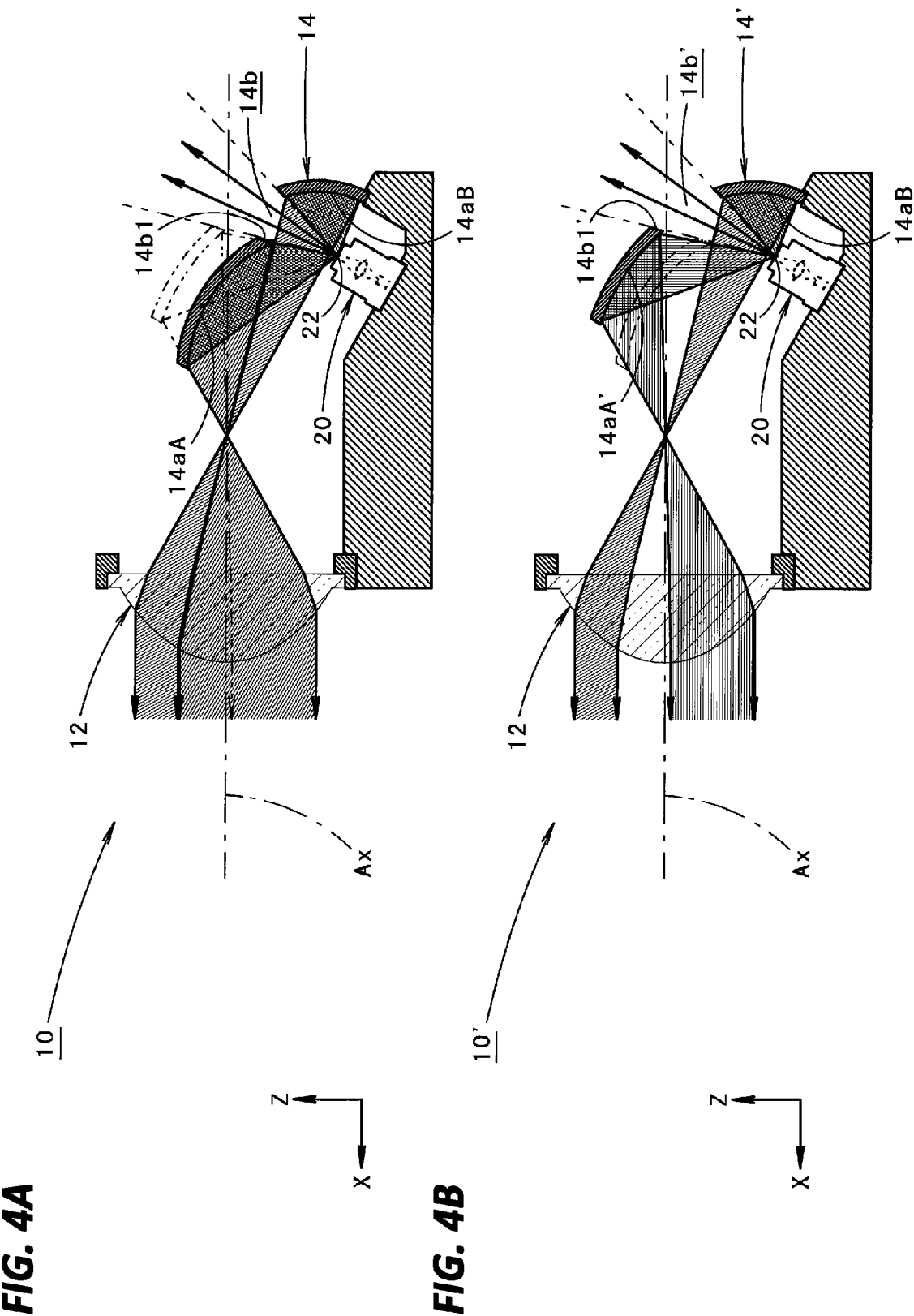
FIGS. 4A and 4B are side cross-sectional views for explaining an operation of the exemplary embodiment, FIG. 4A being a view illustrating the vehicle lamp, and FIG. 4B being a view illustrating a conventional example.

FIG. 4A illustrates the vehicle lamp 10 according to the present exemplary embodiment, and FIG. 4B illustrates the conventional vehicle lamp 10'.

In the vehicle lamp 10 according to the present exemplary embodiment and the conventional vehicle lamp 10', configurations of the reflectors 14 and 14' are partially different, but the other configuration is the same.

That is, a reflector 14' of the conventional vehicle lamp 10' is configured such that a portion of the first reflective area 14aA in the reflector 14 of the vehicle lamp 10 according to the present exemplary embodiment is configured as a first reflective area 14aA'.

The first reflective area 14aA' is formed in a curved surface shape, obtained by extending the surface shape of the second reflective area 14aB, at the front side of an opening 14b'.

In this case, the position of the front end edge of the first reflective area 14aA' is set such that a position at which the reflected light from the front end edge of the first reflective area 14aA' is incident on the projection lens 12 coincides with a position at which the reflected light from the front end edge of the first reflective area 14aA is incident on the projection lens 12.

In addition, the position of the rear end edge of the first reflective area 14aA' is defined by a front end surface 14b1' of the opening 14b', but the front end surface 14b1' of the opening 14b' is set to a position at which the front end surface 14b1 of the opening 14b is moved in parallel along a straight line indicated by a one-dot chain line in the drawings.

As described above, when the maximum angular range within which the reflected light from the reflector 14' is incident on the projection lens 12 in the conventional vehicle lamp 10' is set to the same value as the maximum angular range within which the reflected light from the reflector 14 is incident on the projection lens 12 in the vehicle lamp 10 according to the present exemplary embodiment, as illustrated in FIG. 4B, since the reflected light cannot be obtained from the area of the reflector 14' in which the opening 14b' is formed, the reflected light from the reflector 14' is not incident on the projection lens 12 in a portion from the area near below the optical axis Ax to the area slightly above the optical axis Ax.

On the other hand, as illustrated in FIG. 4A, in the vehicle lamp 10 according to the present exemplary embodiment, since the first reflective area 14aA located at the front side of the opening 14b is displaced to the light emitter 22 side, with respect to the second reflective area 14aB located at the rear side of the opening 14b, even when the reflected light cannot be obtained from the area of the reflector 14 in which the opening 14b is formed, the reflected light from the reflector is incident on substantially the entire area of the projection lens 12 within the above angular range.

This is because a portion that interconnects the point P1 of the bent line L1 and the rear-side focal point F substantially coincides with a portion that interconnects the point P2 of the bent line L2 and the rear-side focal point F, as illustrated in FIG. 3.

As described above, since the reflected light from the reflector 14 is incident on substantially the entire area of the projection lens 12 within the above angular range, in a case where it is assumed that the second reflective area 14aB extends to the front end position of the opening 14b, the first reflective area 14aA is configured to reflect the light emitted from the light emitter 22, toward the area in which the light emitted from the light emitter 22 and reflected by the assumed imaginary reflective area is incident on the projection lens 12.

In addition, in FIGS. 1 to 3, the position of the first reflective area 14aA' of the reflector 14' in the conventional vehicle lamp 10' is indicated by a two-dot chain line.

Figure 5:
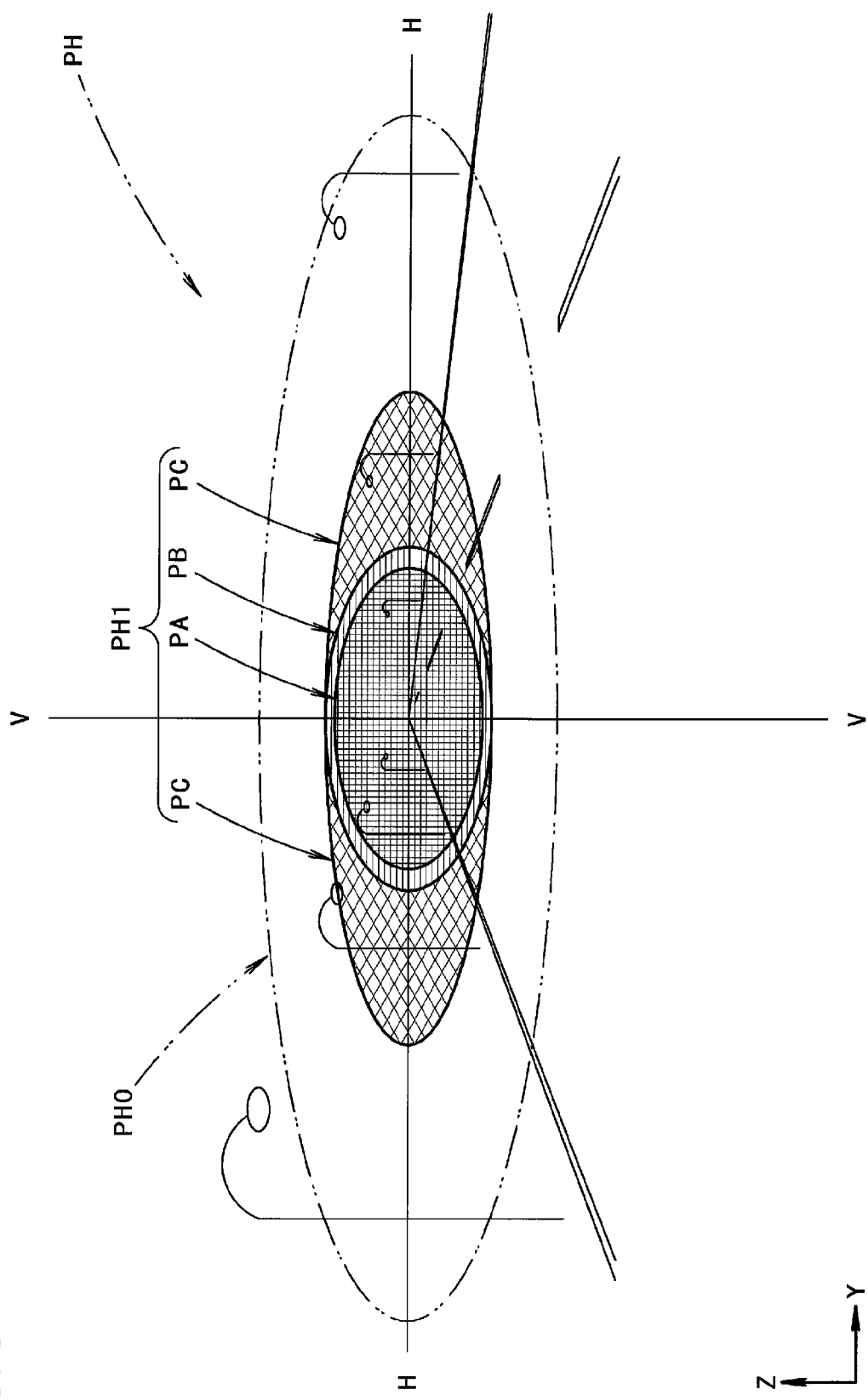
FIG. 5 is a view illustrating a light distribution pattern formed by irradiation light from the vehicle lamp.

FIG. 5 is a view illustrating a light distribution pattern PH1 formed on an imaginary vertical screen, which is disposed at a position 25 m ahead of the lamp, by the light irradiating the front of the vehicle lamp 10 in a transparent manner.

The light distribution pattern PH1 is a light distribution pattern formed as a part of a high beam light distribution pattern PH.

The high beam light distribution pattern PH is formed as a combined light distribution pattern of a basic light distribution pattern PH0 formed by irradiation light from another vehicle lamp (not illustrated) and the light distribution pattern PH1.

The basic light distribution pattern PH0 is formed as a horizontally elongated light distribution pattern that widely spreads in the transversal direction around H-V (vanishing point in the lamp front direction).

On the other hand, the light distribution pattern PH1 is formed as a spot-shaped light distribution pattern that is slightly horizontally elongated around H-V. Thereby, a high luminous intensity area is formed at the center of the high beam light distribution pattern PH.

The light distribution pattern PH1 is formed as a combined light distribution pattern of first, second, and third light distribution patterns PA, PB and PC.

The first light distribution pattern PA is a light distribution pattern formed by the reflected light from the first reflective area 14aA, and is formed as a spot-shaped light distribution pattern that is slightly horizontally elongated around H-V.

The second light distribution pattern PB is a light distribution pattern formed by the reflected light from the second reflective area 14aB, and is formed as a spot-shaped light distribution pattern that is slightly horizontally elongated around H-V. The second light distribution pattern PB is slightly larger than the first light distribution pattern PA.

The third light distribution pattern PC is a light distribution pattern formed by the reflected light from the third reflective area 14aC, and is formed as a light distribution pattern that continuously spreads from both the left and right sides of the second light distribution pattern PB to the left and right sides.

Next, the acting effects of the present exemplary embodiment will be described.

The vehicle lamp 10 according to the present exemplary embodiment is configured as a projector type lamp unit that reflects the light emitted from the light emitter 22, which emits light by laser light irradiation, by the reflector 14, and the reflector 14 has an opening 14b formed through the reflector 14, in the portion located on the extension line of the optical path directed from the laser light emitting element 24 toward the light emitter 22. Since the reflective surface 14a of the reflector 14 is formed such that the first reflective area 14aA located at the front side of the opening 14b is displaced to the light emitter 22 side with respect to the second reflective area 14aB located at the rear side of the opening 14b, the following acting effects may be obtained.

That is, since the first reflective area 14aA is displaced to the light emitter 22 side with respect to the second reflective area 14aB, as compared with a conventional case where the first reflective area 14aA' is formed into a curved surface shape obtained by extending the second reflective area 14aB, it is possible to secure a large solid angle on the basis of the light emission center S of the light emitter 22. Thereby, a bright light distribution pattern PH1 may be formed even when the opening 14b is formed in the reflector 14.

As described above, according to the present exemplary embodiment, in the projector type vehicle lamp 10 configured to reflect the light emitted from the light emitter 22, which emits light by laser light irradiation by the reflector 14, it is possible to form the bright light distribution pattern PH1 even when the opening 14b is formed in the reflector 14.

In addition, in a case where it is assumed that the second reflective area 14aB extends to the front end position of the opening 14b, since the first reflective area 14aA of the reflector 14 of the present exemplary embodiment is configured to reflect the light emitted from the light emitter 22, toward the area in which the light emitted from the light emitter 22 and reflected by the assumed imaginary reflective area is incident on the projection lens 12, the reflected light from the first reflective area 14aA is incident on the area in which the reflected light from the imaginary reflective area is incident on the projection lens 12. Therefore, the projection lens 12 may be effectively used over a wide range, and this makes it possible to perform light distribution control with high accuracy.

Moreover, in the present exemplary embodiment, since both the first and second reflective areas 14aA and 14aB are configured as a curved surface having an ellipsoidal surface as a reference surface, and moreover, the eccentricity of the ellipsoidal surface, which serves as the reference surface of the first reflective area 14aA, is set to a value larger than the eccentricity of the ellipsoidal surface, which serves as the reference surface of the second reflective area 14aB, the degree of convergence of light of the first light distribution pattern PA formed by the reflected light from the first reflective area 14aA may become close to the degree of convergence of light of the second light distribution pattern PB formed by the reflected light from the second reflective area 14aB. Then, this makes it possible to form the bright light distribution pattern PH1 in which the spot-shaped light distribution patterns PA and PB having a uniform size are superimposed.

In this case, since the first and second reflective areas 14aA and 14aB are configured to reflect the light emitted from the light emitter 22, toward the rear-side focal point F of the projection lens 12 in the vertical plane including the optical axis Ax of the projection lens 12, it is possible to maximize the degree of convergence of light of the first and second light distribution patterns PA and PB formed by the reflected light from each of the first and second reflective areas 14aA and 14aB in the vertical direction. Then, this makes it possible to form the entire light distribution pattern PH1 as a light distribution pattern having excellent far visibility in front of the vehicle.

In addition, in the present exemplary embodiment, since the third reflective area 14aC, excluding the first and second reflective areas 14aA and 14aB, on the reflective surface 14a of the reflector 14 is formed by using the ellipsoidal surface, which serves as the reference surface of the second reflective area 14aB, as a reference surface, it is possible to form the third light distribution pattern PC, formed by the reflected light from the third reflective area 14aC, as a light distribution pattern that is smoothly connected to the second light distribution pattern PB.

In the above exemplary embodiment, the amount of displacement of the first reflective area 14aA to the light emitter 22 side has been described as being set to a value at which a portion that interconnects the point P1 of the bent line L1 and the rear-side focal point F substantially coincides with a portion that interconnects the point P2 of the bent line L2 and the rear-side focal point F, but a configuration in which the amount of displacement is set to any other value is also possible.

In the above exemplary embodiment, as a configuration of each of the first and second reflective areas 14aA and 14aB, a cross sectional shape along a plane including a straight line that interconnects the light emission center S of the light emitter 22 and the rear-side focal point F of the projection lens 12 has been described as being set to an ellipsoidal shape in which the light emission center S is the first focal point and the rear-side focal point F is the second focal point, but a configuration in which the cross-sectional shape is set to a curvilinear shape different from the ellipsoidal shape is also possible. In this case, a cross-sectional shape in which a plurality of curves are connected to each other is also possible.

In the above exemplary embodiment, the light emitter 22 has been described as being supported on the base member 18 in a state where the light emitting surface thereof is oriented in a direction that is inclined to the rear side relative to the vertical upper direction, but a configuration in which the light emitter 22 is supported on the base member 18 in a state where the light emitting surface thereof is oriented in the vertical upper direction.

Next, modifications of the above exemplary embodiment will be described.

First, a first modification of the above exemplary embodiment will be described.

FIG. 6A is a view similar to FIG. 3 illustrating a major part of the vehicle lamp according to the present modification.

As illustrated in FIG. 6A, a basic configuration of the present modification is the same as that in the above exemplary embodiment, but a configuration of the reflector 114 is different from that in the above exemplary embodiment.

The basic configuration of the reflector 114 of the present modification is the same as that of the above exemplary embodiment, but the reflector 114 is configured with a resin molded article, and the front end surface 114b1 of the opening 114b is formed so as to extend in a direction that is more inclined to the rear side than that in the exemplary embodiment (i.e., in a direction intersecting a straight line that extends at the angle θ). Then, the front end surface 114b1 of the opening 114b is subjected to a reflective surface treatment by, for example, aluminum vapor deposition.

In a case of adopting the configuration of the present modification, there is a possibility that the front end surface 114b1 of the opening 114b is irradiated with laser light due to, for example, falling off of the light emitter 22. Since the front end surface 114b1 is subjected to a reflective surface treatment, the laser light may be reflected from the front end surface 114b1.

Accordingly, despite the fact that the reflector 114 is configured with a resin molded article, it is possible to prevent the peripheral portion of the opening 114b from inadvertently melting and being damaged by laser light irradiation.

Then, this makes it possible to form the front end surface 114b1 at an inclination angle that facilitates molding of the reflector 114 since it is possible to increase the degree of freedom of the shape of the inner peripheral surface of the opening 114b.

In addition, a configuration in which not only the front end surface 114b1 of the opening 114b but also the entire inner peripheral surface thereof are subjected to a reflective surface treatment is also possible.

Next, a second modification of the above exemplary embodiment will be described.

FIG. 6B is a view similar to FIG. 3 illustrating a major part of the vehicle lamp according to the present modification.

As illustrated in FIG. 6B, a basic configuration of the present modification is the same as that in the above exemplary embodiment, but a configuration of a reflector 214 is different from that in the above exemplary embodiment.

The basic configuration of the reflector 214 of the present modification is similar to that in the above exemplary embodiment, but the reflector 214 is configured with a die-cast molded article, and the front end surface 214b1 of the opening 214b is formed so as to extend in a direction that is more inclined to the rear side than in the exemplary embodiment (i.e., in a direction intersecting a straight line that extends at the angle θ). Then, the front end surface 214b1 of the opening 214b is subjected to a light absorption treatment by, for example, black painting.

In a case of adopting the configuration of the present modification, there is a possibility that the front end surface 214b1 of the opening 214b is irradiated with the laser light due to, for example, falling off of the light emitter 22, but the front end surface 214b1 may absorb the laser light since a light absorption treatment is performed on the front end surface 214b1. Therefore, it is possible to prevent the laser light reflected from the front end surface 214b1 from becoming stray light and irradiating the front of the vehicle, which causes the generation of glare light.

In this case, since the reflector 214 is configured with a die-cast molded article, despite the fact that the front end surface 214b1 of the opening 214b is subjected to a light absorption treatment, there is no risk of the peripheral portion of the front end surface 214b melting. Therefore, the degree of freedom of the shape of the inner peripheral surface of the opening 214b may be increased, and the front end surface 214b1 may be formed at an inclination angle at which the reflector 214 is easily formed.

In addition, a configuration in which a light absorption treatment is performed not only on the front end surface 214b1 of the opening 214b but also on the entire inner peripheral surface thereof is also possible.

Next, a third modification of the above exemplary embodiment will be described.

FIG. 7A is a plan view illustrating a reflector 314 of the vehicle lamp according to the present modification as a single item.

As illustrated in FIG. 7A, a basic configuration of the reflector 314 of the present modification is the same as that in the above exemplary embodiment, but the reflector 314 of the present modification is different from that of the above exemplary embodiment in that a pair of right and left vertical wall portions 314c located at both right and left sides of the first reflective area 314aA are formed as a pair of right and left slits 314d, which are formed only on the front end portion of the reflector 314 and communicate with the opening 314b.

In addition, configurations of the first, second, and third reflective areas 314aA, 314aB and 314aC are the same as those in the above exemplary embodiment.

By adopting the reflector 314 of the present modification, it is possible to achieve the same acting effects as those in the above exemplary embodiment and to reduce the weight of the reflector 314.

Next, a fourth modification of the above exemplary embodiment will be described.

FIG. 7B is a plan view illustrating a reflector 414 of the vehicle lamp according to the present modification as a single item.

As illustrated in FIG. 7B, a basic configuration of the reflector 414 of the present modification is the same as that in the above exemplary embodiment, but the reflector 414 is different from that in the above exemplary embodiment in that a pair of right and left slits 414d, which extend in the horizontal direction, are formed in both right and left sides of an opening 414b so as to communicate with the opening 414b.

Then, in the present modification, the reflector 414 is divided into two front and rear portions by the pair of right and left slits 414d.

In addition, the configurations of first, second, and third reflective areas 414aA, 414aB, and 414aC and vertical wall portion 414c are the same as those in the above exemplary embodiment.

By adopting the reflector 414 of the present modification, it is possible to easily form the reflector 414 while achieving the same acting effects as those in the above exemplary embodiment.

Next, a fifth modification of the above exemplary embodiment will be described.

Figure 8:
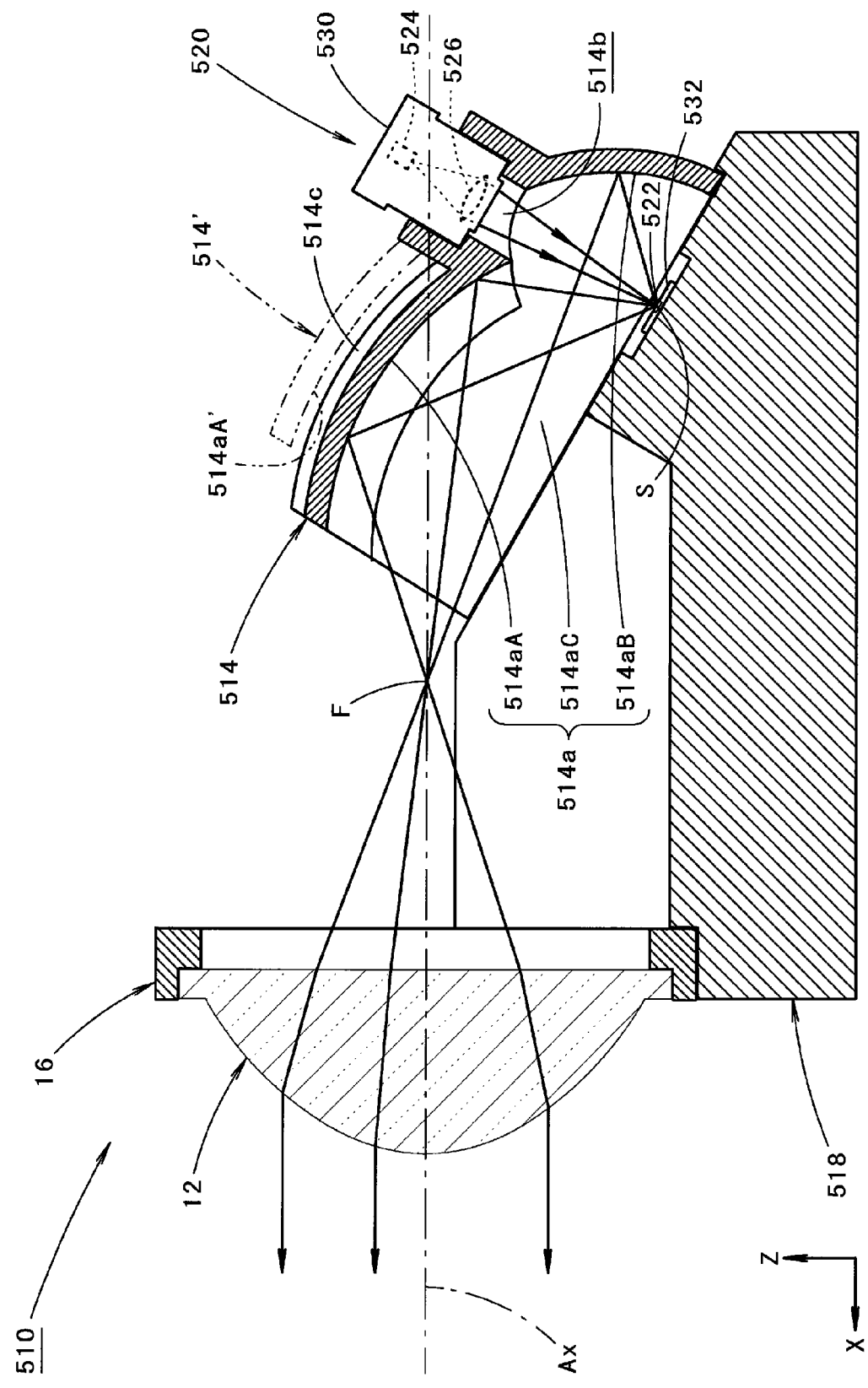
FIG. 8 is a view similar to FIG. 1 illustrating a vehicle lamp according to a fifth modification of the exemplary embodiment.

FIG. 8 is a view similar to FIG. 1 illustrating a vehicle lamp 510 according to the present modification.

As illustrated in FIG. 8, a basic configuration of the present modification is the same as that in the above exemplary embodiment, but a configuration of a light source unit 520 is different from that in the above exemplary embodiment, and thus, configurations of a reflector 514 and a base member 518 are partially different from those in the above exemplary embodiment.

The light source unit 520 of the present modification is configured such that a light emitter 522, a laser light emitting element 524, and a condensing lens 526, which constitute the light source unit 520, are arranged separately.

Then, in the present modification, the light emitted from the laser light emitting element 524 is condensed on the light emitter 522 from the surface side of the light emitter 522 by the condensing lens 526, and is reflected, as diffused light, from the light emitter 522.

The light emitter 522 is configured with a phosphor that emits white light by laser light irradiation from the laser light emitting element 524, and is formed with a circular light emitting surface on the surface side thereof. The light emitter 522 is supported on a base member 518 with a light emitter support member 532 interposed therebetween in a state where the light emitting surface thereof is oriented in a direction that is included by about 10° to 45° (e.g., about 30°) to the rear side relative to the vertical upper direction.

On the other hand, the laser light emitting element 524 and the condensing lens 526 are supported on the reflector 514 in a state of being accommodated in a housing 530. The reflector 514 has an opening 514b formed through the reflector 514 in the portion located on the optical path of the laser beam directed from the laser light emitting element 524 toward the light emitter 522. The opening portion 514b has a cylindrical inner peripheral surface shape, and the opening area thereof is smaller than the opening 14b formed in the reflector 14 of the above exemplary embodiment.

In the present modification, a reflective surface 514a of the reflector 514 is formed such that a first reflective area 514aA located at the front side of the opening 514b is displaced to the light emitter 522 side, with respect to a second reflective area 514aB located at the rear side of the opening 514b. However, in the present modification, since the opening area of the opening 514b is smaller than the opening area of the opening 14b in the above exemplary embodiment, the amount of displacement of the first reflective area 514aA to the light emitter 522 side is smaller than that in the above exemplary embodiment.

Both the first and second reflective areas 514aA and 514aB have a reflective surface shape formed by using an ellipsoidal surface, which has the light emission center S of the light emitter 522 as the first focal point, as a reference surface.

Specifically, each of the first and second reflective areas 514aA and 514aB has an ellipsoidal cross-sectional shape along a plane including a straight line that interconnects the light emission center S of the light emitter 522 and the rear-side focal point F of the projection lens 12, the eccentricity thereof is set so as to gradually increase from the vertical cross section toward the horizontal cross section, and the rear-side focal point F of the projection lens 12 is the second focal point in the vertical cross section.

Then, this makes it possible for both of the first and second reflective areas 514aA and 514aB to concentrate the light emitted from the light emitter 522 on the rear-side focal point F of the projection lens 12 in the vertical cross section.

However, the eccentricity of the ellipsoidal surface, which is the reference surface of the first reflective area 514aA, is set to a value larger than the eccentricity of the ellipsoidal surface, which is the reference surface of the second reflective area 514aB.

The third reflective area 514aC, excluding the first and second reflective areas 514aA and 514aB, on the reflective surface 514a of the reflector 514 is formed by using the ellipsoidal surface, which serves as the reference surface of the second reflective area 514aB, as the reference surface, and has a reflective surface shape obtained by extending the reflective surface shape of the second reflective area 514aB.

The reflector 514 is formed, on both left and right sides of the first reflective area 514aA, with a pair of right and left vertical wall portions 514c, which interconnects a portion forming the first reflective area 514aA and a portion forming the third reflective area 514aC. The respective vertical wall portions 514c are formed so as to extend in a direction that is inclined at a predetermined angle in a direction away from the optical axis Ax relative to the vertical upper direction. The predetermined angle is set to a value that is as small as possible within a range in which light emitted from the light emitter 522 is not incident on the inner surface of the vertical wall portions 514c.

Even in a case of adopting the configuration of the present modification, it is possible to obtain the same acting effects as those in the above exemplary embodiment.

That is, since the first reflective area 514aA is displaced to the light emitter 522 side with respect to the second reflective area 514aB, as compared with a case where the first reflective area 514aA' is formed in a curved surface shape, obtained by extending the second reflective area 514aB, as in the conventional reflector 514', it is possible to secure a large solid angle on the basis of the light emission center S of the light emitter 522, and this makes it possible to increase the utilization rate of luminous flux with respect to the light emitted from the light emitter 522. Thus, a bright light distribution pattern may be formed despite the fact that the opening 514b is formed in the reflector 514.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a projection lens;
   a light emitter disposed behind the projection lens, and
   a reflector configured to reflect light emitted from the light emitter, toward the projection lens,
   wherein the light emitter is configured to emit light by laser light irradiation from a laser light emitting element,
   the reflector has an opening formed through the reflector in a portion located on an optical path of laser light directed from the laser light emitting element toward the light emitter or on an extension line of the optical path, and
   a reflective surface of the reflector includes a first reflective area located at a front side of the opening and a second reflective area located at a rear side of the opening, the first reflective area being displaced to a light emitter side with respect to the second reflective area.

2. The vehicle lamp of claim 1, wherein both the first and second reflective areas are configured with a curved surface having an ellipsoidal surface as a reference surface, and
   an eccentricity of the ellipsoid surface, which serves as the reference surface of the first reflective area, is set to a value larger than an eccentricity of the ellipsoidal surface, which serves as the reference surface of the second reflective area.

3. The vehicle lamp of claim 2, wherein both the first and second reflective areas are configured to reflect the light from emitted the light emitter, toward a rear-side focal point of the projection lens in a vertical plane including an optical axis of the projection lens.

4. The vehicle lamp of claim 1, wherein a reflective area, other than the first and second reflective areas, on the reflective surface of the reflector is formed using the ellipsoidal surface, which serves as the reference surface of the second reflective area, as a reference surface.

5. The vehicle lamp of claim 2, wherein a reflective area, other than the first and second reflective areas, on the reflective surface of the reflector is formed by using the ellipsoidal surface, which serves as the reference surface of the second reflective area, as a reference surface.

6. The vehicle lamp of claim 3, wherein a reflective area, other than the first and second reflective areas, on the reflective surface of the reflector is formed by using the ellipsoidal surface, which serves as the reference surface of the second reflective area, as a reference surface.

7. The vehicle lamp of claim 1, wherein a reflective surface treatment is performed on an inner peripheral surface of the opening.

8. The vehicle lamp of claim 1, wherein a light absorption treatment is performed on an inner peripheral surface of the opening.

9. A vehicle lamp comprising:

a projection lens;

a light emitter disposed behind the projection lens; and a reflector configured to reflect light emitted from the light emitter toward the projection lens, wherein the light emitter is configured to emit light by laser light irradiation from a laser light emitting element, the reflector is has an opening formed through the reflector in a portion located on an optical path of laser light directed from the laser light emitting element toward the light emitter or on an extension line of the optical path, a reflective surface of the reflector includes a first reflective area located at a front side of the opening and a second reflective area located at a rear side of the opening, and when the second reflective area extends to a front end position of the opening, the first reflective area is configured to reflect the light emitted from the light emitter, toward an area in which the light emitted from the light emitter and reflected by an imaginary reflective area in which the second reflective area extends to the front end position of the opening is incident on the projection lens.

* * * * *